March 8, 1927.
C. A. HUFFMAN
1,620,101
PACIFIC COAST TYPE TRIMMER WITH TIGHTENER TAKE-UP
Filed July 13 1925 2 Sheets-Sheet 1
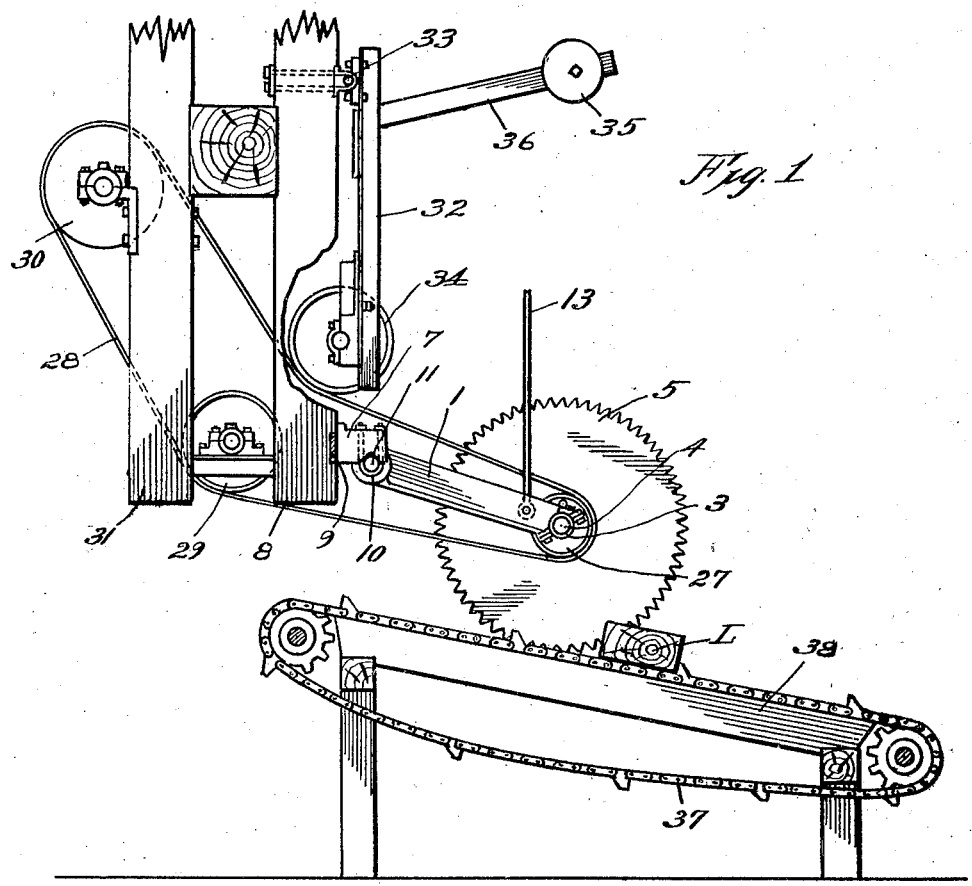
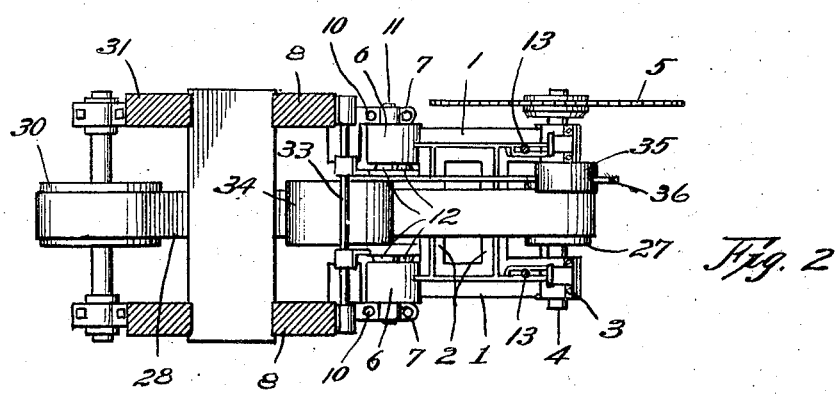
Inventor,
Charles A. Huffman, March 8, 1927.
C. A. HUFFMAN
1,620,101
PACIFIC COAST TYPE TRIMMER WITH TIGHTENER TAKE-UP
Filed July 13, 1925    2 Sheets-Sheet 2
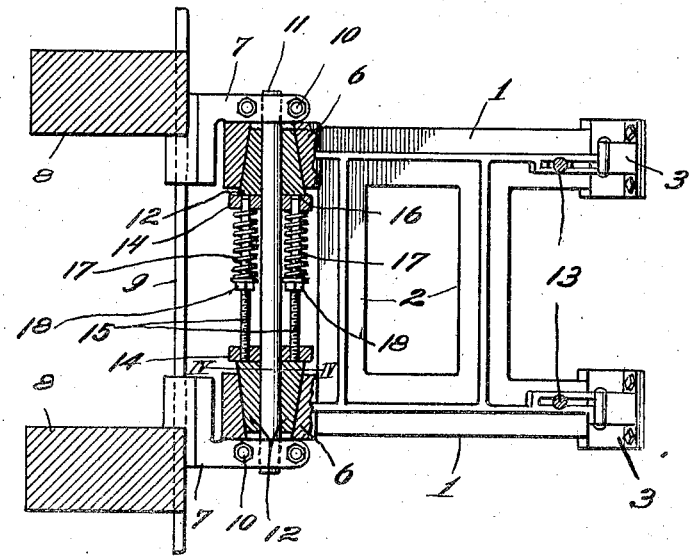
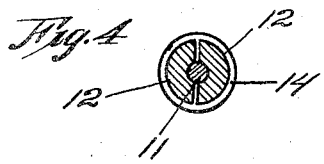
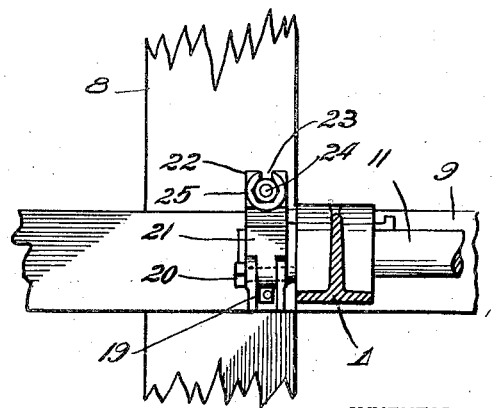
INVENTOR.
Charles A. Huffman.
BY
ATTORNEYS Patented Mar. 8, 1927.

1,620,101

UNITED STATES PATENT OFFICE.

CHARLES A. HUFFMAN, OF LONGVIEW, WASHINGTON, ASSIGNOR TO THE LONG-BELL LUMBER COMPANY, OF LONGVIEW, WASHINGTON, A CORPORATION OF MISSOURI.

PACIFIC COAST TYPE TRIMMER WITH TIGHTENER TAKE UP.

Application filed July 13, 1925. Serial No. 43,243.

This invention relates to lumber trimmers and has for its object to produce means for automatically compensating for the wear in the saw-ladder trunnions. In lumber trimmers the saws are constantly revolving at high speed regardless of whether the particular saw is in its operative or inoperative position and it is of importance to provide a steady and tight bearing to avoid wobbling or uneven running of the saw.

With the object named in view the invention consists in certain novel and useful features of construction and organization of parts as hereinafter described and claimed; and in order that it may be fully understood, reference is to be had to the accompanying drawings, in which:—

Figure 1 is an end elevation of one saw of a trimmer in operative position.

Figure 2 is a plan view of the mechanism as shown in Figure 1.

Figure 3 is an enlarged plan view of a saw-ladder with the saw shaft and drive belt omitted and with the ladder trunnion in section.

Figure 4 is a section on the line IV—IV of Figure 3.

Figure 5 is an end elevation of a modified form of take-up bearing.

Figure 6 is a face view of the bearing shown in Figure 5.

In the said drawings, where like reference characters identify corresponding parts in all of the figures, the saw-ladder frame comprises a pair of spaced parallel arms 1 integrally formed with connecting arms or braces 2. The arms 1 at one end are formed with suitable bearings 3 within which is journaled a saw-shaft 4 carrying at one of its ends a circular saw 5.

The opposite ends of the arms 1 are formed with oppositely-facing conical bearings 6 and are snugly received within a pair of brackets 7 securely fastened to the front part of the framework 8 of the trimmer braced by a cross-brace 9. The ends of the brackets 7 are engaged by the legs of U-bolts 10 which tightly clamp up against the underside of the brackets a short trunnion shaft or rod 11.

Slidingly fitted on opposite sides of the rods 11 and received within each of the bearings 3 are two pairs of conical trunnions comprising oppositely-facing half cones 12, around which the shaft ladder swings when moved upwardly by its connections 13. In order to automatically maintain a tight bearing to compensate for wear, a pair of circular follower plates 14 are slidingly received on the shaft 11 and are in abutment with the projecting ends of the conical bearings 12. One of said plates 14 is rigidly secured to the ends of a pair of oppositely disposed bolts 15, the opposite ends thereof being slidingly received with a pair of openings 16 in the other follower plate 14. Encircling the bolts are a pair of expansion springs 17 which by exerting pressure in opposite directions against the loose follower plate 14 and against a pair of tension adjusting nuts 18 on the bolts, automatically force the half cones 12 into the bearings 3 and thereby compensate for the wear of the bearings. It will be apparent that as the pressure on the inclined face of the cones is transmitted to the parallel surfaces of the center shaft 3, the saw-ladder will swing around the cone bearings and not around the center shaft.

In Figures 4 and 5, a modified form of takeup is illustrated in which a bracket 19 is secured to the trimmer frame 8 and is formed with one-half of a bearing. Pivoted at 20 to the said bracket 19 is the other part of the bearing 21 (slightly less than half). Formed on the bearing part 21 is an upstanding ear 22 having a vertical upwardly-opening slot 23. Secured to the bracket 19 and passing through the slot 23 is a bolt 24 provided with an adjusting nut 25 at its end. Fitted between the nut 25 and the outer face of the ear 22 is an expansion spring 26 which by constantly tending to close the bearing around the pivot 20 will compensate for wear.

In the general application of saw-ladders exemplified by Figure 1, the saw shaft 4 carries midway between the parallel arms 1, a pulley wheel 27 encircled by a drive belt 28 which passes rearwardly around a suitable idler pulley 29 and over a constantly driven pulley 30 secured to the back member 31 of the trimmer frame. As each trimmer saw is vertically adjusted through its connections 13 in operative or inoperative position according to the lengths of lumber to be cut, means must be provided to automatically tension the driving belt, and in order to maintain the proper tension on the belt regardless of the position of the saw in its travel around the cone bearings 12, a support 32 is pivotally mounted at 33 on the frame work 8 and carries at its lower end an idler or tension pulley 34 in contact with the belt 28. A uniform tension on the belt is maintained by the pulley 34 through the gravitative action of an adjustable weight 35 carried at the end of a laterally projecting arm 36 secured to the support 31. The lumber L to be cut into lengths is fed to the saw by means of an endless travelling chain 37 carried by a suitable table or support 38.

From the above description it will be apparent that while I have described and illustrated the preferred forms of the invention, I reserve the right to make all changes properly falling within the spirit and scope of the appended claims.

I claim:

1. A saw ladder having opposed conical bearing-receiving openings at one end, a pair of conical bearings received in said openings, a suitably-supported rod extending axially through said conical bearings for guiding the same, and expansion means on said rod for applying continuous opposite endwise pressure on the bearings to force them in the bearing openings without effecting longitudinal movement of the rod.

2. A saw ladder having opposed conical bearing-receiving openings at one end, a suitably-supported guide rod extending through said openings, a pair of slit conical bearings at each end of said rod within said bearing openings, a follower on said rod in contact with one pair of said conical bearings, a pair of bolts carried by said follower, a second follower in contact with the other pair of bearings and having sliding engagement with said bolts, and expansion springs exerting pressure in opposite directions on said followers to force the conical bearings into position.

In witness whereof I hereunto affix my signature.

CHARLES A. HUFFMAN.